US007944582B2

(12) United States Patent
Kato

(10) Patent No.: US 7,944,582 B2

(45) Date of Patent: May 17, 2011

(54) CARRIAGE DRIVE CONTROL METHOD AND PRINTING APPARATUS WHICH ADOPTS THE METHOD

(75) Inventor: Hiroaki Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 999 days.

(21) Appl. No.: 10/852,146

(22) Filed: May 25, 2004

(65) Prior Publication Data

US 2005/0001876 A1 Jan. 6, 2005

(30) Foreign Application Priority Data

Jun. 4, 2003 (JP) ................................. 2003-159541

(51) Int. Cl.

*G06K 15/00* (2006.01)
*G06K 15/10* (2006.01)
*G06K 15/22* (2006.01)
*B41J 2/435* (2006.01)
*B41J 29/38* (2006.01)
*B41J 2/165* (2006.01)
*B41J 2/05* (2006.01)
*B41J 2/12* (2006.01)

(52) U.S. Cl. ......... 358/1.3; 358/1.12; 358/1.5; 347/247; 347/10; 347/32; 347/57; 347/79

(58) Field of Classification Search ................. 358/1.12, 358/1.16, 1.9, 1.13, 1.5; 347/50, 174, 215, 347/218, 17, 14; 180/446; 73/777; 715/517; 709/201

See application file for complete search history.

(56) References Cited

U.S. PATENT DOCUMENTS 4,125,845 A * 11/1978 Stevenson, Jr. ................. 347/17
4,647,039 A * 3/1987 Noffsinger ......................... 482/8
4,791,435 A * 12/1988 Smith et al. ...................... 347/17
4,914,726 A 4/1990 Burke
4,989,513 A * 2/1991 Toda et al. .................... 101/158

(Continued)

FOREIGN PATENT DOCUMENTS

JP 01-178478 A 7/1989

(Continued)

OTHER PUBLICATIONS

Communication re Japanese Appln. No. 2003-159541, dated Feb. 26, 2010, Japanese Patent Office.

(Continued)

*Primary Examiner* — King Y Poon
*Assistant Examiner* — Akwasi M Sarpong
(74) *Attorney, Agent, or Firm* — Fitzpatrick, Cella, Harper & Scinto

(57) ABSTRACT

A carriage drive control method capable of detecting the acceleration of a carriage at low cost, improving external disturbance suppression of the carriage, and thus improving image quality. This method is applied to a printing apparatus which prints by relatively moving on a printing medium a carriage to which a printhead is mounted. In the printing apparatus, the moving velocity of the carriage is detected, the acceleration of the carriage is detected on the basis of outputs from first and second strain gauges which are respectively attached on the two sides of a fixing portion for fixing the carriage on a belt for transmitting a drive force from a carriage motor to the carriage, the carriage velocity is compensated on the basis of the carriage acceleration detected for the detected moving velocity of the carriage, and driving of the carriage motor is feedback-controlled on the basis of the compensated carriage velocity.

10 Claims, 12 Drawing Sheets

U.S. PATENT DOCUMENTS

| | | | | |
|---|---|---|---|---|
| 5,036,266 | A | 7/1991 | Burke | |
| 5,493,300 | A * | 2/1996 | Eiler et al. | 347/14 |
| 5,604,844 | A * | 2/1997 | Nishiyama | 358/1.12 |
| 5,953,497 | A * | 9/1999 | Kokubo et al. | 358/1.9 |
| 6,134,020 | A * | 10/2000 | Masumoto et al. | 358/1.16 |
| 6,144,460 | A * | 11/2000 | Omo et al. | 358/1.16 |
| 6,499,069 | B1 * | 12/2002 | Shimura | 358/1.13 |
| 6,618,159 | B1 * | 9/2003 | Tobita et al. | 358/1.13 |
| 6,733,103 | B2 * | 5/2004 | Murata | 347/14 |
| 6,739,199 | B1 * | 5/2004 | Nikkel | 73/777 |
| 6,762,771 | B1 * | 7/2004 | Niki et al. | 358/1.13 |
| 2001/0014236 | A1 * | 8/2001 | Hevenor et al. | 347/215 |
| 2002/0033300 | A1 * | 3/2002 | Takeuchi et al. | 180/446 |
| 2002/0057325 | A1 * | 5/2002 | Kapushinski et al. | 347/174 |
| 2002/0097317 | A1 * | 7/2002 | Wood et al. | 347/218 |
| 2002/0130913 | A1 * | 9/2002 | Murata | 347/14 |
| 2002/0149646 | A1 * | 10/2002 | Pawlowski et al. | 347/50 |
| 2002/0159086 | A1 * | 10/2002 | Shinomiya et al. | 358/1.13 |
| 2003/0020941 | A1 * | 1/2003 | Matsumoto et al. | 358/1.13 |
| 2003/0213640 | A1 * | 11/2003 | Kato et al. | 180/446 |
| 2004/0036893 | A1 * | 2/2004 | Sussmeier | 358/1.5 |

FOREIGN PATENT DOCUMENTS

| | | |
|---|---|---|
| JP | 1-234280 | 9/1989 |
| JP | 4-218817 | 8/1992 |
| JP | 2784002 | 8/1998 |

OTHER PUBLICATIONS

Office Action Appln. No. 2003-159541, Japanese Patent Office, Nov. 2, 2009.

* cited by examiner

CARRIAGE DRIVE CONTROL METHOD AND PRINTING APPARATUS WHICH ADOPTS THE METHOD

CLAIM OF PRIORITY

This application claims priority from Japanese Patent Application No. 2003-159541, entitled "Carriage Drive Control Method" and filed on Jun. 4, 2003, the entire contents of which are incorporated herein by reference.

FIELD OF THE INVENTION

This invention relates to a carriage drive control method and a printing apparatus to which the method is applied and, more particularly, to a carriage drive control method applied to a printing apparatus which drives a carriage to which an inkjet printhead is mounted.

BACKGROUND OF THE INVENTION

Along with a remarkable development of the electronics technology, the computer performance has greatly advanced. For example, to perform color image processing, a large amount of data must be processed within a short period of time, which has been difficult for a conventional computer in terms of the processing speed. However, recent improvement of the computer performance makes such color image processing popular.

A color printing apparatus (to be referred to as a printing apparatus hereinafter) for outputting a color image rapidly becomes utilized over a wide range. For example, an output of a color image using a printing apparatus such as an inkjet printer is replacing conventional photo-printing. The image size widely ranges from a small namecard size to a large B0 poster size or more.

With the spread of such printing apparatuses, demands have arisen for higher image quality and higher throughput of the apparatuses. The printing apparatus generally prints while scanning a printhead on a printing medium. The carriage to which the printhead is mounted must achieve higher precision and higher speed. In order to meet these demands, conventional printing apparatuses employ a so-called servo-mechanism which drives a carriage while detecting displacement information of the carriage by a linear encoder.

FIG. 8 is a block diagram showing the schematic configuration of the servo-mechanism of a carriage in a conventional printing apparatus.

As shown in FIG. 8, a carriage 1 to which a printhead is mounted is driven by a belt 3. The belt 3 is fixed to the carriage 1 via a belt holder 4. The belt 3 is suspended between a pulley 6 and an idle pulley 7 without any slackness. The pulley 6 is coupled to a carriage motor 5 serving as a drive source. A torque generated by the carriage motor 5 is converted into a thrust which drives the carriage 1 in the scanning direction via the pulley 6, idle pulley 7, and belt 3.

Displacement information of the carriage 1 is detected by a linear encoder 18. Scanning of the carriage 1 on a printing medium requires displacement information and velocity information of the carriage 1. The velocity information is extracted on the basis of an output signal from the linear encoder 18. A velocity detector 12 generates velocity information on the basis of an output signal from the linear encoder 18. The velocity information generation method is known well. For example, velocity information is generated by measuring the time width of a series of pulses output from the linear encoder 18 or calculating the change amount of the series of pulses per unit time.

The obtained velocity information of the carriage 1 undergoes comparison and subtraction with an output from a velocity instruction value generator 10 by a comparator 30. The result is supplied to a velocity compensator 11, and properly compensated into a control signal for driving the carriage motor 5 via a power amplifier 16.

The servo-mechanism of the conventional carriage forms a feedback loop pertaining to velocity information of the carriage 1.

FIG. 9 is a block diagram for explaining the operation of the conventional servo-mechanism in detail.

The operation of the servo-mechanism will be further explained with reference to FIG. 9. In FIG. 9, the operation of a power-to-thrust conversion mechanism 15 is to apply a thrust to the carriage 1 in accordance with an output from the velocity compensator 11. The power-to-thrust conversion mechanism 15 is comprised of the power amplifier 16, carriage motor 5, pulley 6, idle pulley 7, belt 3, and the like. The carriage 1 is mechanically one rigid body, and an acceleration corresponding to the thrust appears in the carriage 1. The acceleration is proportional to the thrust and inversely proportional to the mass of the carriage 1. A velocity supplied to the velocity compensator 11 is expressed as the first order integration of the acceleration. In general, the performance of the servo-mechanism is evaluated by traceability to a target value and external disturbance suppression. The servo-mechanism of the conventional carriage is designed to achieve these two performance capabilities by feeding back velocity information.

However, it is known well that only velocity feedback cannot provide satisfactory external disturbance suppression.

Influential external disturbance factors are as follows.

First, there are a characteristic drift caused by the temperature rises of the power amplifier 16 and carriage motor 5, and the influence of the counter electromotive voltage of the carriage motor 5. Also, variations in mechanical load torque and the torque ripple of the carriage motor 5 act as an external disturbance force on the servo-mechanism. The conventional system which feeds back velocity information does not have sufficient external disturbance suppression, and variations in the velocity of the carriage 1 upon scanning the carriage are unavoidable.

In order to improve external disturbance suppression of the servo-mechanism, for example, a current feedback power amplifier has conventionally been used. According to this method, the current of the carriage motor 5 is managed by feedback control. However, the thrust which acts on the carriage 1 is not directly managed, and the influence of external disturbance factors cannot be sufficiently eliminated.

External disturbance suppression is also improved by forming multiple feedback loops for the velocity and acceleration of the carriage (see, e.g., Japanese Patent Publication (JPB2) No. 2,784,002).

Japanese Patent Publication No. 2,784,002 discloses an acceleration-controlled servo system.

FIG. 10 is a block diagram showing a state in which Japanese Patent Publication No. 2,784,002 is applied to the servo-mechanism of a carriage in a printing apparatus.

In FIG. 10, an acceleration compensator 13 is arranged on the output side of the velocity compensator 11, and an acceleration feedback loop is formed within a velocity feedback loop. The acceleration of the carriage 1 is integrated by an integrator circuit 22 to obtain the velocity. This method is very effective in principle, but Japanese Patent Publication No. 2,784,002 does not explicitly specify any practical means about how to detect the carriage acceleration at high precision. Japanese Patent Publication No. 2,784,002 assumes that a motor and a mechanism to be controlled (carriage in a printing apparatus) are rigidly coupled. A tachometer is attached to the motor, and a velocity signal output from the tachometer is differentiated to obtain an acceleration signal.

However, the acceleration signal disclosed in Japanese Patent Publication No. 2,784,002 relates to the rotation of the motor, and not to the carriage. This can be ignored if the motor and carriage are rigidly coupled. However, in the printing apparatus, a belt which is a flexible member is used as a force transmission mechanism, and dynamics exists between rotational motion of the motor and translational motion of the carriage. That is, the rotation angular acceleration of the motor cannot substitute for the acceleration of the carriage. Even if the method disclosed in Japanese Patent Publication No. 2,784,002 described above is applied to a printing apparatus, i.e., the tachometer is attached to the motor in the printing apparatus, no intended servo-mechanism can be implemented.

The carriage acceleration can be directly detected by attaching an acceleration sensor to the carriage. However, the acceleration sensor is generally very expensive, and implementation of the acceleration sensor in the printing apparatus is not practical in terms of the cost.

Also, in a case where the linear encoder shown in FIG. 8 is employed, the encoder must be a high-resolution type to obtain acceleration information with sufficient precision. This results in increasing the cost of the apparatus.

As described above, since the servo-mechanism of a carriage employed in a conventional printing apparatus performs velocity information feedback as a basic control system, the conventional printing apparatus cannot attain satisfactory external disturbance suppression. Variations in carriage velocity cannot be suppressed upon scanning the carriage, resulting in printing unevenness in the carriage scanning direction.

SUMMARY OF THE INVENTION

Accordingly, the present invention is conceived as a response to the above-described disadvantages of the conventional art.

For example, a carriage drive control method according to the present invention is capable of detecting the acceleration of a carriage at low cost, improving external disturbance suppression of the carriage, and thus improving image quality.

According to this aspect of the present invention, preferably, there is provided a carriage drive control method applied to a printing apparatus which prints by relatively moving a carriage to which a printhead is mounted on a printing medium, comprising: a first detection step of detecting a moving velocity of the carriage; a second detection step of detecting an acceleration of the carriage on the basis of outputs from first and second strain gauges which are respectively attached on two sides of a fixing unit for fixing the carriage on a belt for transmitting a drive force from a carriage motor to the carriage; a compensation step of compensating for the velocity of the carriage, on the basis of the acceleration of the carriage detected at the second detection step for the moving velocity of the carriage detected at the first detection step; a control step of feedback-controlling driving of the carriage motor on the basis of the velocity of the carriage compensated at the compensation step.

The present invention may be implemented by applying the method having the above steps to a printing apparatus. The printing apparatus has the following configuration.

That is, a printing apparatus which prints by relatively moving a carriage to which a printhead is mounted on a printing medium, comprises: a carriage motor which generates a drive force for driving the carriage; a belt which fixes the carriage and transmits the drive force generated by the carriage motor to the carriage; first and second strain gauges which are arranged on two sides of a fixing portion to which the carriage is fixed on the belt; first detection means for detecting a moving velocity of the carriage; second detection means for detecting an acceleration of the carriage on the basis of outputs respectively from the first and second strain gauges; compensation means for compensating for the velocity of the carriage, on the basis of the acceleration of the carriage detected by the second detection means for the moving velocity of the carriage detected by the first detection means; and control means for feedback-controlling driving of the carriage motor on the basis of the velocity of the carriage compensated by the compensation means.

This solving means will be described in more detail. The first detection means desirably includes a linear encoder, and the first and second strain gauges desirably form at least one resistor of a Wheatstone bridge circuit.

The control means includes a first control loop which feedback-controls driving of the carriage motor on the basis of the moving velocity of the carriage, and a second control loop which feedback-controls driving of the carriage motor on the basis of the acceleration of the carriage.

The second detection means may include thrust detection means for detecting a thrust which acts on the carriage, on the basis of outputs respectively from the first and second strain gauges.

The printhead desirably includes an inkjet printhead, and the printing agent desirably includes ink. In this case, the inkjet printhead desirably comprises an electrothermal transducer for generating thermal energy to be applied to ink in order to discharge ink by using the thermal energy.

In accordance with the present invention as described above, in a printing apparatus which prints by relatively moving on a printing medium a carriage to which a printhead is mounted, the moving velocity of the carriage is detected. The acceleration of the carriage is detected on the basis of outputs from the first and second strain gauges which are respectively attached on the two sides of a fixing portion for fixing the carriage on the belt for transmitting a drive force from the carriage motor to the carriage. The carriage velocity is compensated on the basis of the carriage acceleration detected for the detected moving velocity of the carriage. Driving of the carriage motor is feedback-controlled on the basis of the compensated carriage velocity.

The invention is particularly advantageous since multiple feedback loops are formed by a low-cost method using strain gauges and higher-precision carriage drive control can be performed.

When the method according to the present invention is applied to a printing apparatus, higher-quality image printing can be achieved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In this specification, the terms “print” and “printing” not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term “print medium” not only includes a paper sheet used in common printing apparatuses, but also broadly includes materials, such as cloth, a plastic film, a metal plate, glass, ceramics, wood, and leather, capable of accepting ink.

Furthermore, the term “ink” (to be also referred to as a “liquid” hereinafter) should be extensively interpreted similar to the definition of “print” described above. That is, “ink” includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term “nozzle” generally means a set of a discharge orifice, a liquid channel connected to the orifice and an element to generate energy utilized for ink discharge.

<Description of Inkjet Printing Apparatus (FIG. 1)>

Figure 1:
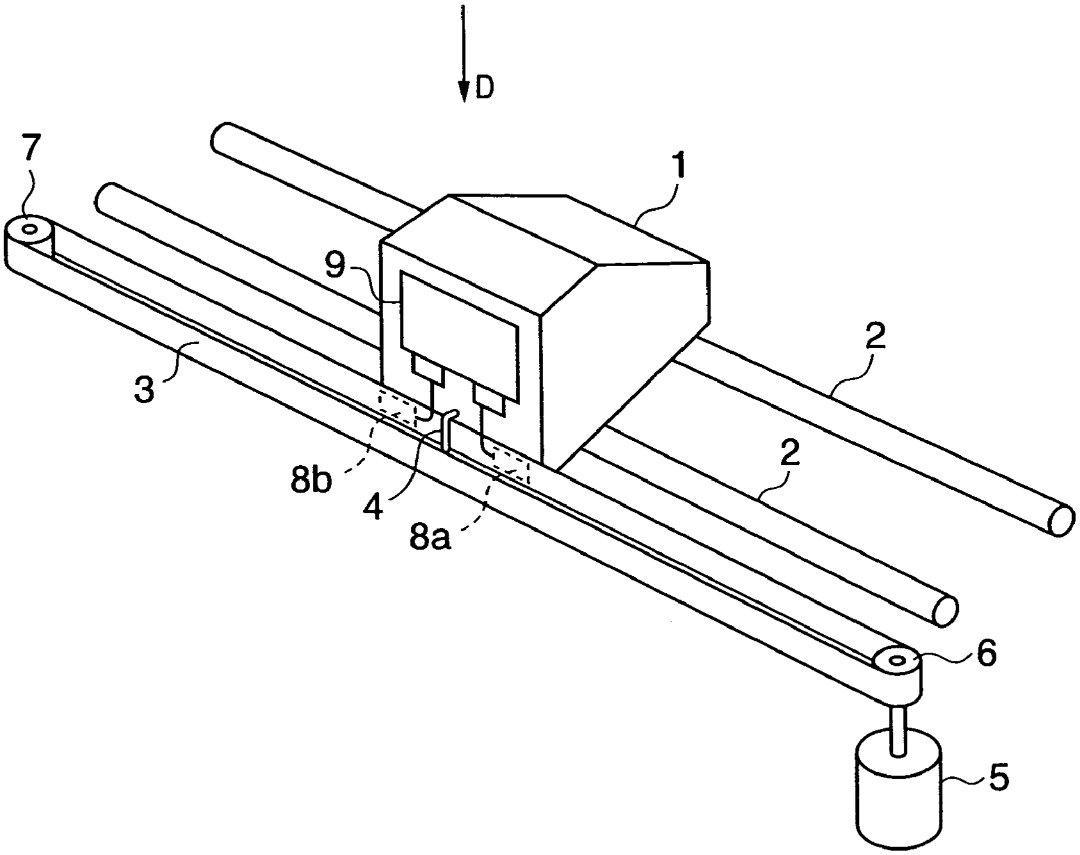
FIG. 1 is an outer perspective view showing a schematic structure around the carriage of an inkjet printing apparatus as a typical embodiment of the present invention.

FIG. 1 is an outer perspective view showing a schematic structure around the carriage of an inkjet printing apparatus as a representative embodiment of the present invention.

A carriage 1 shown in FIG. 1 supports an inkjet printhead (to be referred to as a printhead hereinafter: not shown in FIG. 1). The printhead discharges ink onto a printing medium such as a printing sheet to print while moving in the carriage moving direction.

The carriage 1 which supports the printhead is guided by two guide shafts 2 and reciprocates. A belt 3 is fixed to the carriage 1 via a belt holder 4. The belt 3 is suspended between a pulley 6 and an idle pulley 7 without any slackness. The pulley 6 and idle pulley 7 are respectively arranged at two ends in the scanning direction of the carriage 1. The pulley 6 is coupled to a carriage motor 5 serving as an actuator.

In the embodiment, strain gauges 8*a* and 8*b* are attached to the belt 3. Near the belt holder 4, the strain gauge 8*a* is attached between the pulley 6 and the belt holder 4, and the strain gauge 8*b* is attached between the idle pulley 7 and the belt holder 4. The carriage 1 supports a substrate 9, and the leads of the strain gauges 8*a* and 8*b* are connected to the substrate 9.

Figure 2:
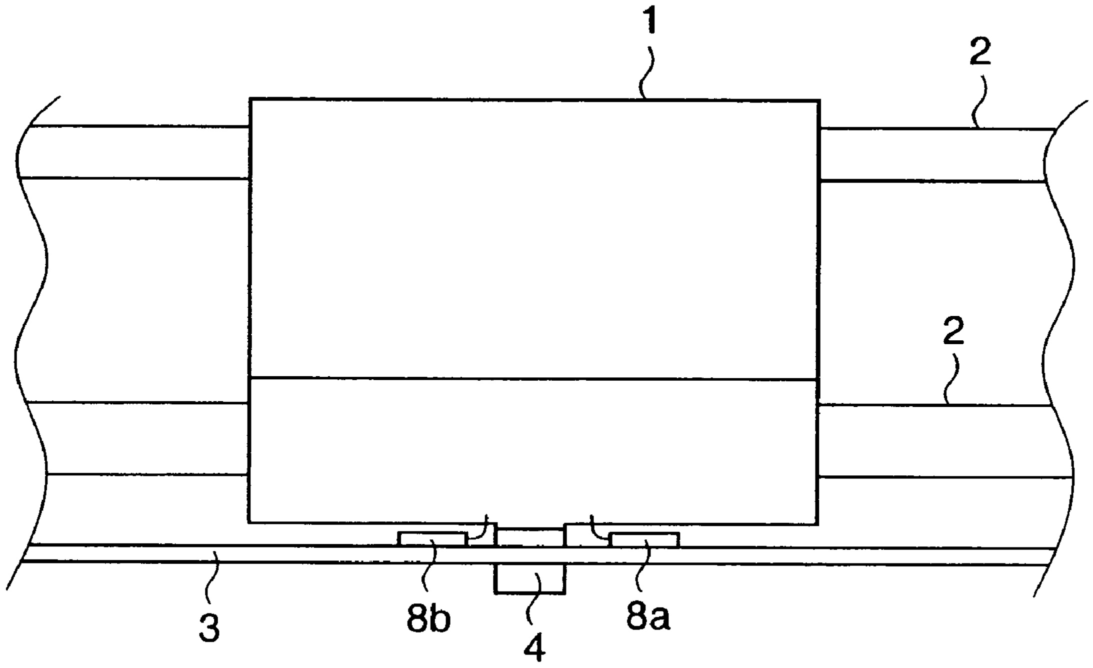
FIG. 2 is a plan view of the periphery of a belt holder 4 when viewed from the top of a carriage 1.

FIG. 2 is a plan view of the periphery of the belt holder 4 when viewed from the top of the carriage 1 in a direction indicated by an arrow D shown in FIG. 1.

FIG. 2 illustrates the attaching state of the strain gauges 8*a* and 8*b* in more detail. The strain gauges 8*a* and 8*b* are attached to the belt 3 almost symmetrically about the belt holder 4.

A drive force generated by the carriage motor 5 is transmitted as a thrust to the carriage 1 via the pulley 6, idle pulley 7, and belt 3. The strain gauges 8*a* and 8*b* detect the thrust or the acceleration of the carriage 1. The thrust transmitted to the carriage 1 is equivalent to a change in the tension of the belt 3. More specifically, when tensions at right and left portions to the belt holder 4 become different, the tension difference acts as a thrust on the carriage 1. The tension of the belt 3 is known to be proportional to the expansion/contraction of the belt 3. The tension of the belt 3 can be measured by measuring the expansion/contraction, i.e., strain of the belt 3 by the strain gauges 8*a* and 8*b*. The strain of the belt 3 is measured at right and left portions to the belt holder 4, and the difference is calculated to evaluate a thrust which acts on the carriage 1.

As is apparent from Newton mechanics, the thrust and acceleration are proportional to each other. Thus, a thrust measured by the strain gauges 8*a* and 8*b* is equivalent to the acceleration of the carriage 1. The acceleration can be obtained by dividing the thrust by the mass of the carriage 1.

The feature of the embodiment is to form multiple feedback loops for the velocity and acceleration by using detected acceleration information of the carriage 1.

Figure 11:
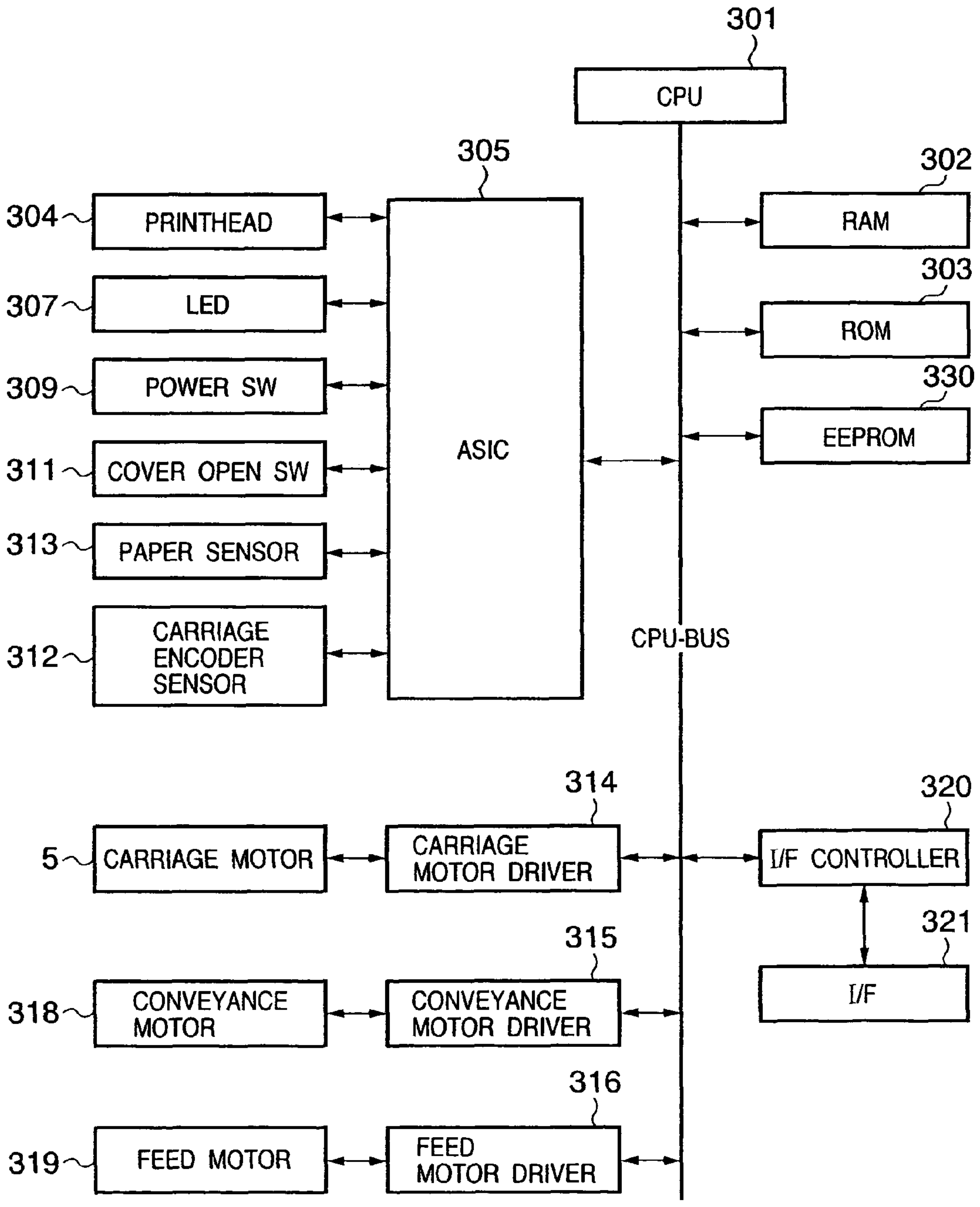
FIG. 11 is a block diagram illustrating an electric construction of an inkjet printing apparatus.

FIG. 11 is a block diagram of an electric construction of the inkjet printing apparatus.

In FIG. 11, numeral 301 denotes a CPU for controlling the operation of the inkjet printing apparatus according to a control program stored in a ROM 303.

Numeral 305 denotes an ASIC. The CPU 301 and ASIC 305 work together so as to perform carriage control, conveyance control and printhead control. The ASIC 305 also has functions of controlling a power LED 307, detecting on/off of a power switch 309 and a cover open switch 311, and detecting a carriage encoder sensor 312 and a paper sensor 313.

Having the above construction, the inkjet printing apparatus performs motor rotation control on a carriage motor 5, a conveyance motor 318, and a feed motor 319 via the respective motor drivers 314-316, based on a print command transmitted to an interface (I/F) 320 from a host (not shown) read out from an I/F controller 320, outputs and transfers print data into a printhead 304 via the ASIC 305, and performs print control based on the print command.

Numeral 302 denotes a RAM (temporary storage) used as a print buffer for temporarily storing developed data for printing reception data (print command and print data) from the host, and as work area for storing necessary information such as a printing speed utilized by the CPU.

The motor drivers 314-316 drive the carriage motor 5, the conveyance motor 318 and the feed motor 319, respectively. These motors are controllably driven via the respective motor drivers 314-316 based on instructions from the CPU 301.

A DC servo motor is used as the carriage motor 5 for the servo control to be described later, while stepping motors are used as the conveyance motor 318 and the feed motor 319.

Numeral 330 denotes an EEPROM for storing the number of printed papers and the number of discharged printed ink droplets. Numeral 303 denotes a ROM (read only memory) for storing a print control program, a carriage and paper conveyance control program, a printer emulation program, font data, and the like. The print control program is executed by the CPU for transferring print data to the printhead 304 for printing.

Two embodiments of carriage control using the printing apparatus having the above structure will be explained.

First Embodiment (FIGS. 3 to 6)

Figure 3:
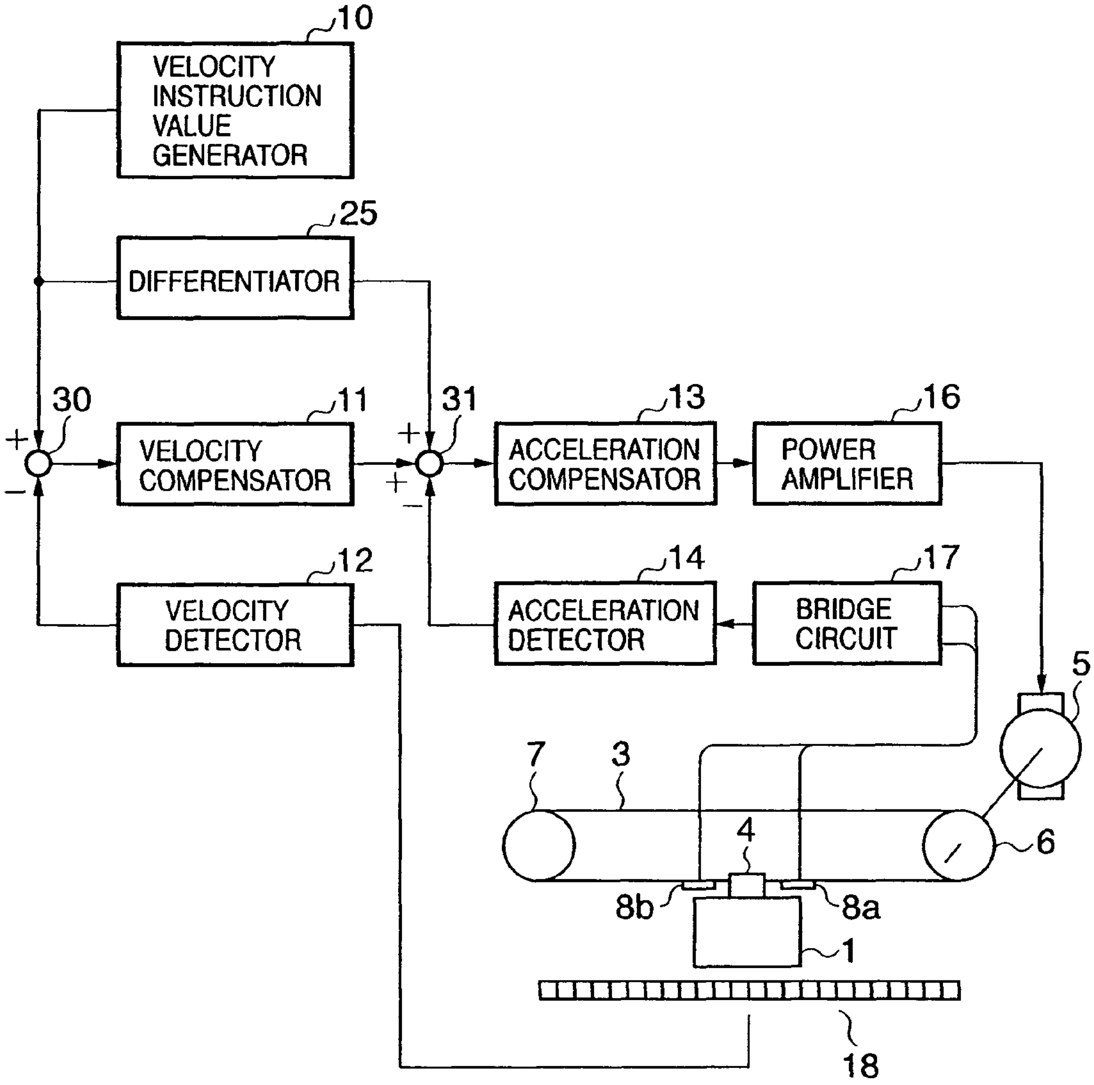
FIG. 3 is a block diagram showing the configuration of servo-mechanism of a carriage 1 according to a first embodiment of the present invention.

FIG. 3 is a block diagram showing the configuration of the servo-mechanism of a carriage 1 according to the first embodiment of the present invention. As described above, the carriage 1 is fixed to a belt 3 via a belt holder 4. The belt 3 is suspended between a pulley 6 and an idle pulley 7 without any slackness. The pulley 6 is coupled to a carriage motor 5 serving as an actuator. Strain gauges 8*a* and 8*b* are attached at positions almost symmetrical about the belt holder 4 on the belt 3 near the belt holder 4. Displacement information of the carriage 1 is detected by a linear encoder 18.

The strain gauges 8*a* and 8*b* are electrically connected to a bridge circuit 17. The configuration of the bridge circuit 17 is shown in FIGS. 4A and 4B or 5 (to be described later).

Figure 4A:
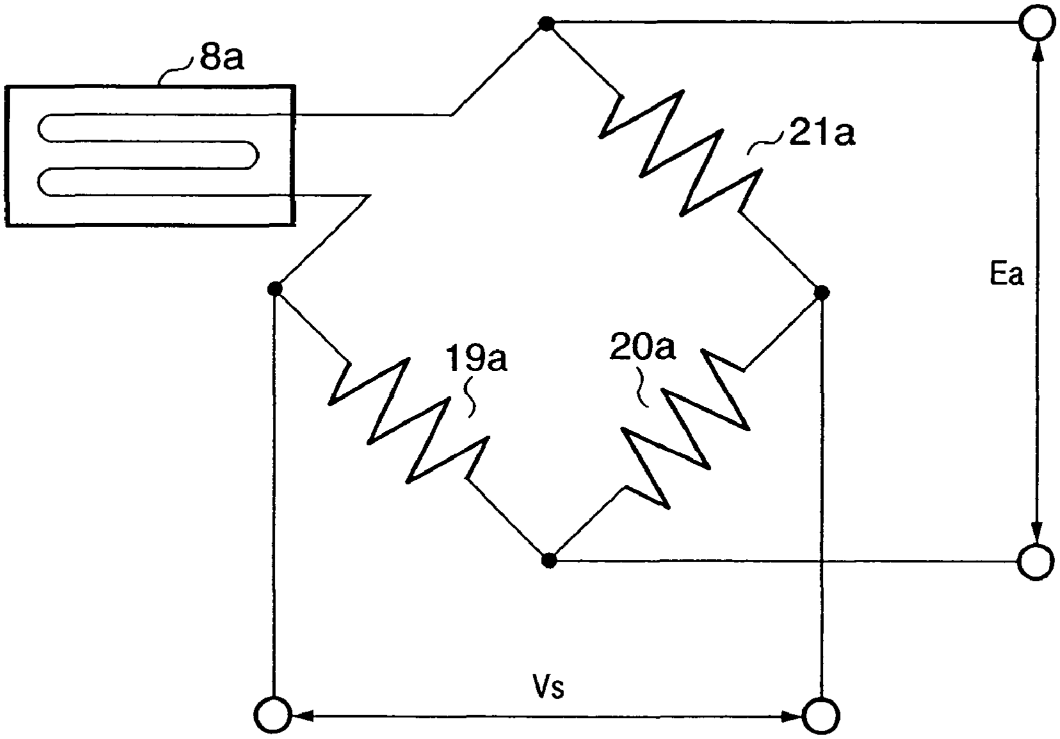
FIG. 4A is a circuit diagram showing an example of the configuration of a bridge circuit 17 including a strain gauge 8*a;*
Figure 4B:
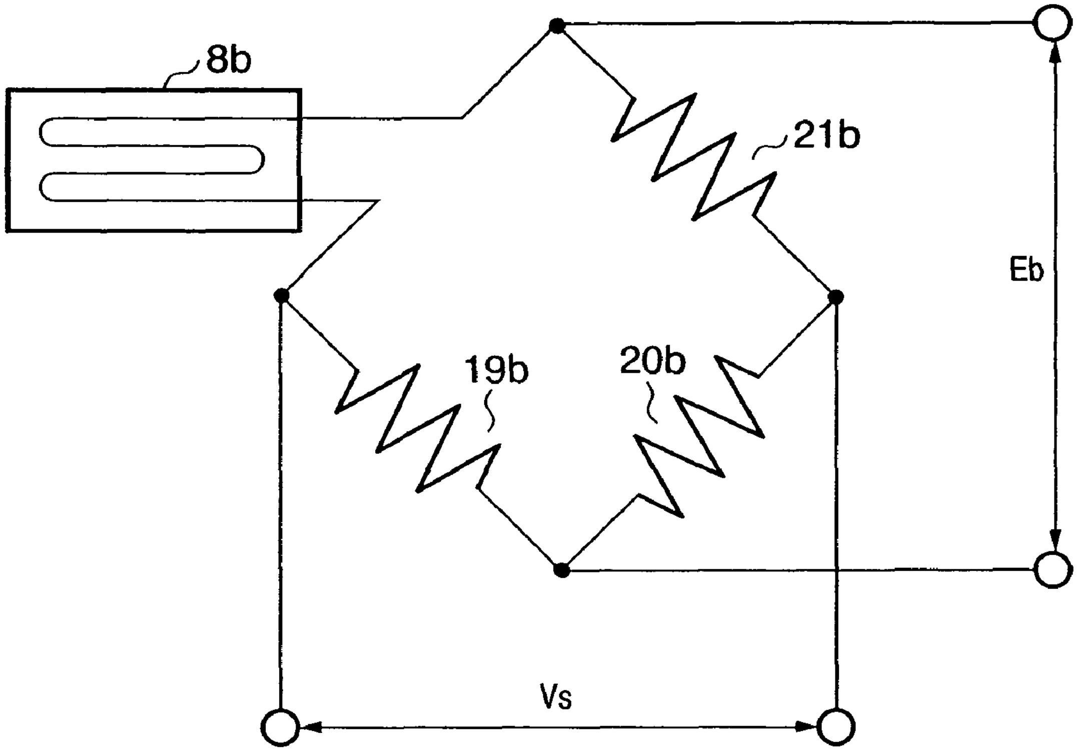
FIG. 4B is a circuit diagram showing an example of the configuration of a bridge circuit 17 including a strain gauge 8*b;*
Figure 5:
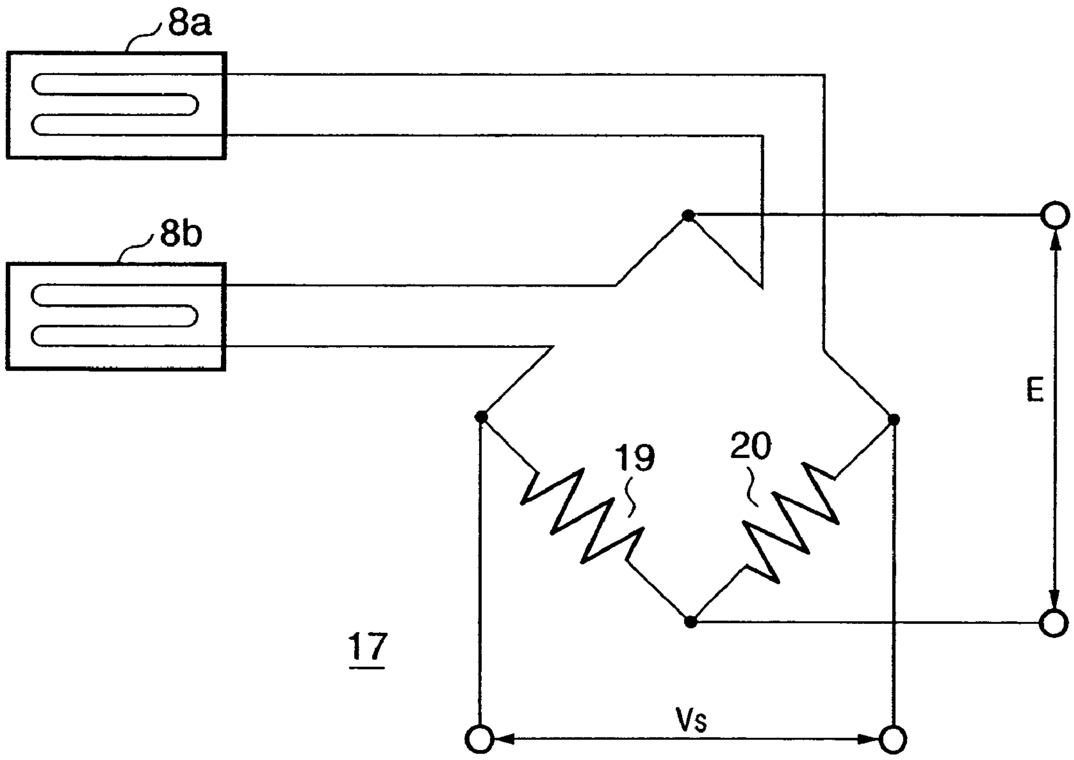
FIG. 5 is a circuit diagram showing another example of the configuration of the bridge circuit 17 including the strain gauges 8*a* and 8*b;*

FIGS. 4A and 4B are circuit diagrams showing an example of the configuration of the bridge circuit 17 including the strain gauges 8*a* and 8*b*.

As shown in FIG. 4A, the strain gauge 8*a* forms a Wheatstone bridge circuit together with resistors 19*a*, 20*a*, and 21*a*. In this circuit configuration, when the tension of the belt 3 changes at a portion where the strain gauge 8*a* is attached, the resistance value of the strain gauge 8*a* changes in accordance with the tension change. Thus, when a drive voltage Vs is applied to the Wheatstone bridge circuit, an output voltage Ea is generated according to the tension change.

As shown in FIG. 4B, similar to FIG. 4A, the strain gauge 8*b* forms a Wheatstone bridge circuit together with resistors 19*b*, 20*b*, and 21*b*. When the drive voltage Vs is applied to this circuit, a change in the tension of the belt 3 at a portion where the strain gauge 8*b* is attached is detected as an output voltage Eb. The difference signal between the output voltages Ea and Eb represents a thrust applied to the carriage 1. This thrust is equivalent to the acceleration of the carriage 1.

FIG. 5 is a circuit diagram showing another example of the configuration of the bridge circuit 17 including the strain gauges 8*a* and 8*b*.

As shown in FIG. 5, the strain gauges 8*a* and 8*b* may be connected to one Wheatstone bridge circuit. In this case, an output voltage E is generated in accordance with the difference between the resistance values of the strain gauges 8*a* and 8*b*. The output voltage E represents a thrust applied to the carriage 1, and is equivalent to the acceleration of the carriage 1.

The implementation portion of the bridge circuit 17 will be explained with reference to FIG. 1.

In FIG. 1, the carriage 1 integrates the substrate 9. The bridge circuit 17 is implemented on the substrate 9. The leads of the strain gauges 8*a* and 8*b* are connected to the substrate 9, and further electrically connected to the bridge circuit 17 on the substrate 9. Such implementation of the bridge circuit 17 on the carriage 1 can minimize the lead lengths of the strain gauges 8*a* and 8*b*. In general, electrical noise is easily picked up at a long lead of the strain gauge. However, the first embodiment can detect the acceleration of the carriage 1 at high precision by implementing the bridge circuit 17 on the carriage 1.

Figure 6:
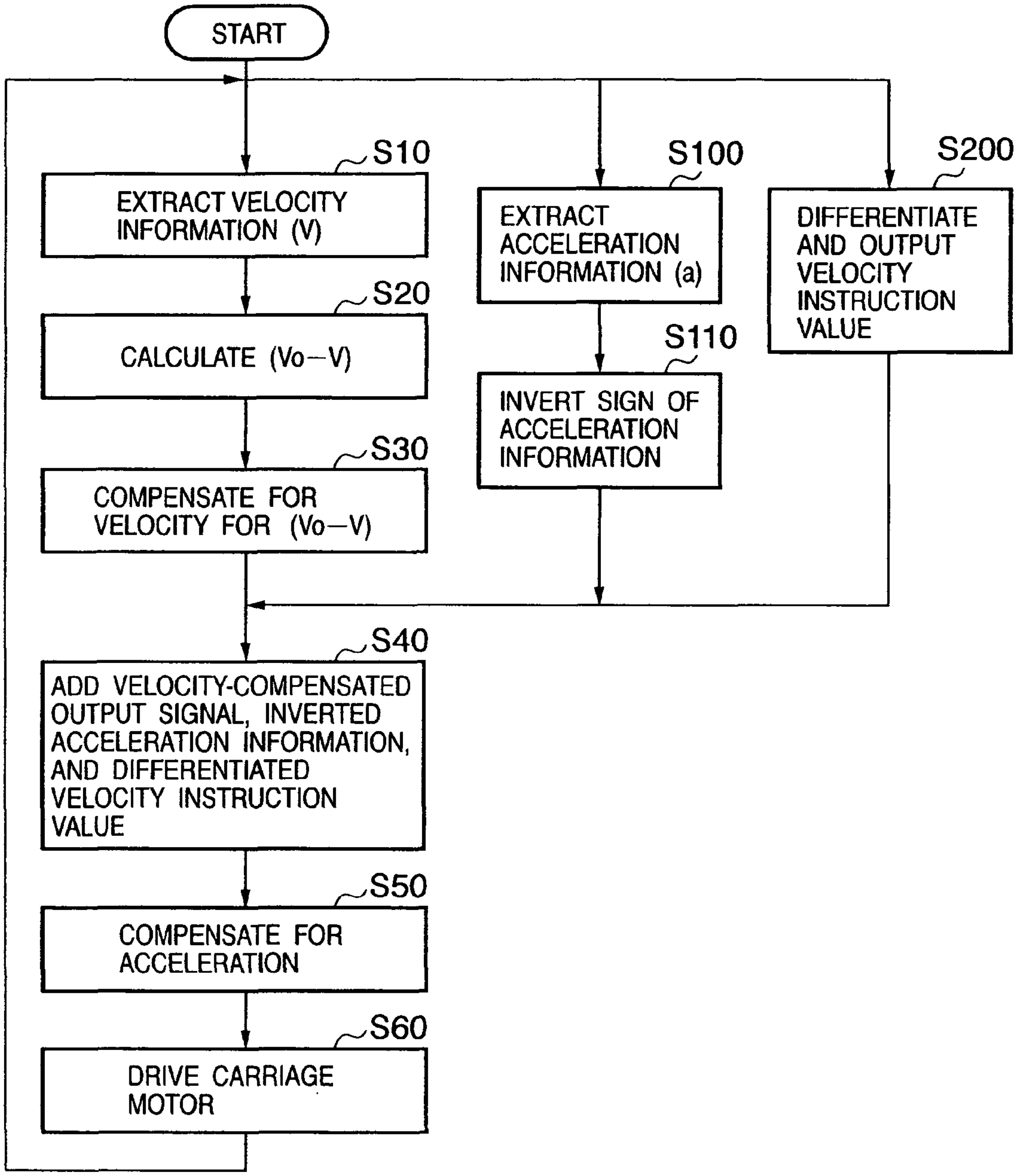
FIG. 6 is a flowchart for explaining the servo-mechanism according to the first embodiment of the present invention.

Referring back to FIG. 3, the servo-mechanism of the carriage 1 according to the first embodiment will be described with reference to the flowchart shown in FIG. 6.

In step S10, a velocity detector 12 extracts velocity information (v) of the carriage 1 on the basis of an output signal from the linear encoder 18. In step S20, the velocity information (v) undergoes comparison and subtraction with an output ($v_0$) from a velocity instruction value generator 10 by a comparator 30. In step S30, the difference is supplied to a velocity compensator 11 and properly compensated, thereby outputting a velocity-compensated signal.

In step S100, an acceleration detector 14 multiplies an output from the bridge circuit 17 by a proper scaling factor to extract acceleration information (a) of the carriage 1. In step S110, the sign of the acceleration information is inverted, and then the resultant information is output. In step S200, a velocity instruction value output from the velocity instruction value generator 10 is differentiated by a differentiator 25, and converted into the dimension of the acceleration, outputting the resultant value.

In step S40, an adder 31 adds the velocity-compensated output signal, sign-inverted acceleration information, and differentiated velocity instruction value, and outputs the sum to an acceleration compensator 13. In step S50, the acceleration compensator 13 compensates for the acceleration, and outputs the acceleration-compensated signal to a power amplifier 16. In step S60, an output signal from the power amplifier 16 drives the carriage motor 5.

The velocity and acceleration of the carriage 1 moved by driving of the carriage motor 5 are extracted in steps S10 and S100.

According to the first embodiment, the velocity feedback loop is formed by steps S10 to S60 and S10 . . . , and the acceleration feedback loop is formed by steps S100, S110, S40 to S60, and S100 . . . . The first embodiment achieves satisfactory suppression against external disturbance by forming multiple feedback loops for the acceleration and velocity. Variations in the velocity and acceleration of the carriage upon scanning the carriage can be suppressed to minimum level against external disturbance factors such as variations in load torque, the torque ripple of the carriage motor, and the temperature drift.

In addition, a velocity instruction value output from the velocity instruction value generator is converted into the dimension of the acceleration by the differentiator 25, and the resultant value is input as an instruction value to the acceleration feedback loop. This can also significantly improve the traceability of the servo-mechanism to a target value.

Figure 7:
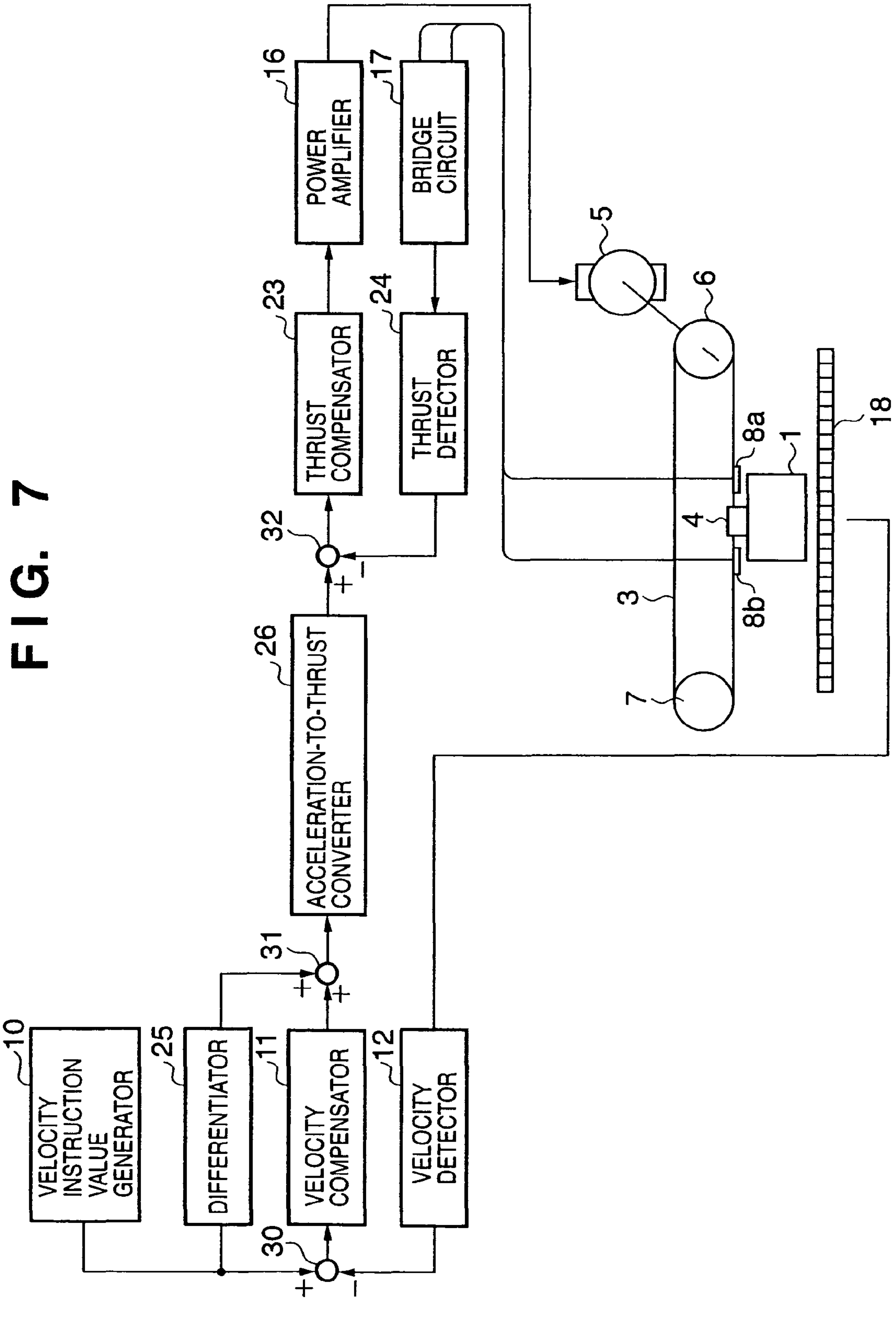
FIG. 7 is a block diagram showing the configuration of the servo-mechanism of a carriage 1 according to a second embodiment of the present invention.
Figure 8:
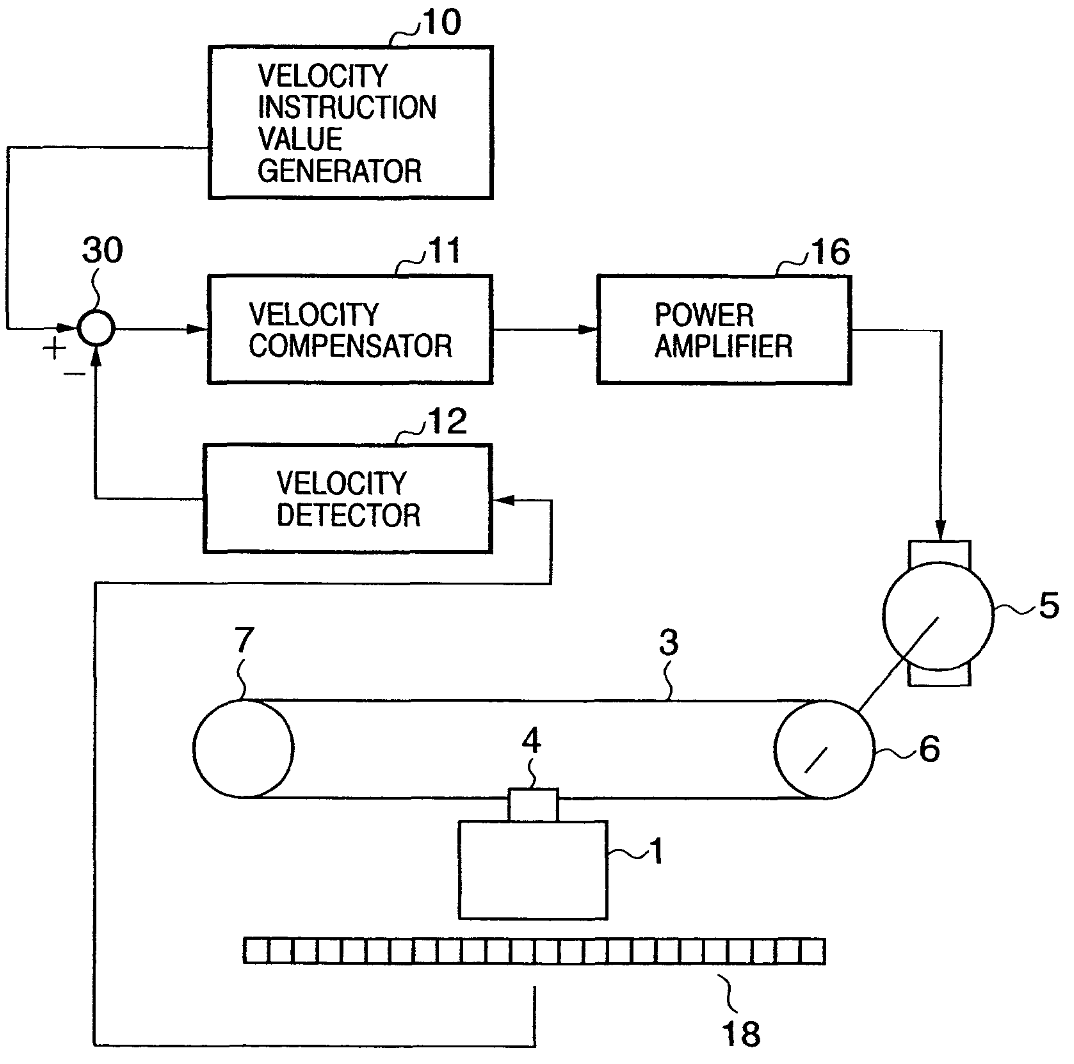
FIG. 8 is a block diagram showing the general schematic configuration of the servo-mechanism of a carriage in a conventional printing apparatus.
Figure 9:
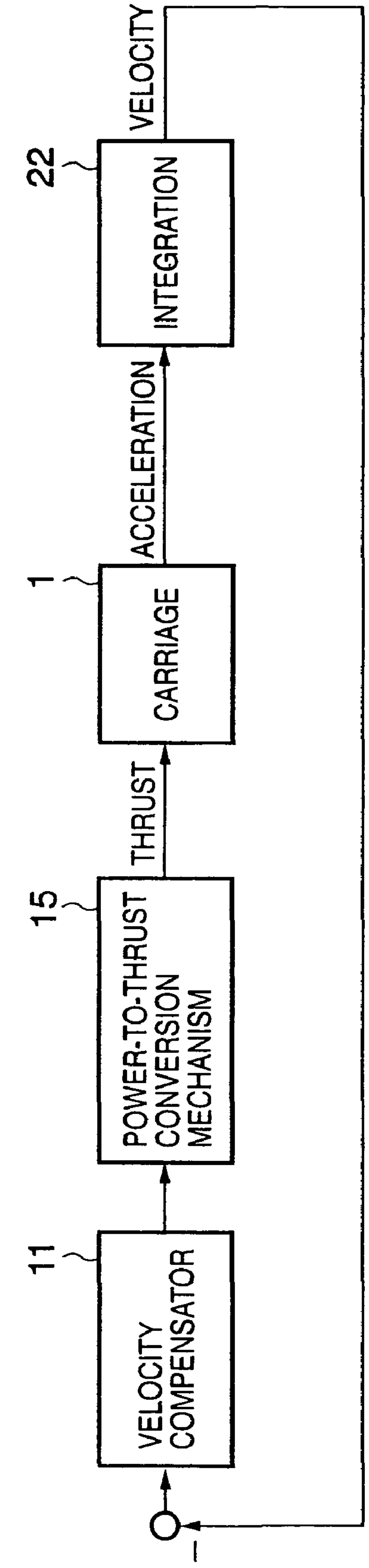
FIG. 9 is a block diagram for explaining the operation of the conventional servo-mechanism in detail.
Figure 10:
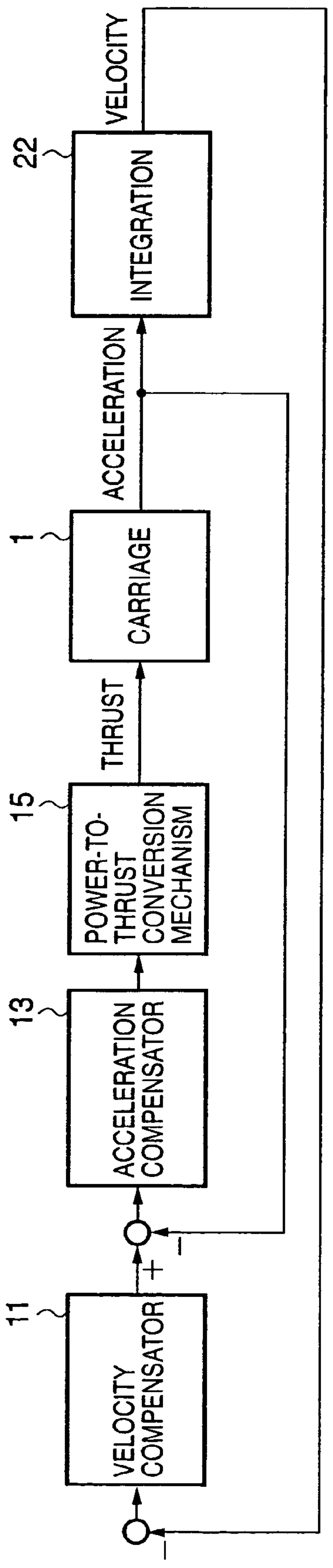
FIG. 10 is a block diagram showing a state in which Japanese Patent Publication No. 2,784,002 is applied to the servo-mechanism of a carriage in a printing apparatus.

Second Embodiment (FIG. 7)

In the second embodiment, multiple feedback loops for the velocity and thrust are formed using strain gauges.

FIG. 7 is a block diagram showing the configuration of the servo-mechanism of a carriage 1 according to the second embodiment of the present invention. In FIG. 7, the same reference numerals as those described in the first embodiment with reference to FIG. 3 denote the same parts, and a description thereof will be omitted.

The difference in configuration between the first and second embodiments is that a feedback loop is formed for a thrust which acts on the carriage 1, instead of acceleration information. As described above, the acceleration and thrust are equivalent to each other, and information on a thrust which acts on the carriage 1 can be extracted from an output from a bridge circuit 17.

In FIG. 7, a thrust detector 24 multiplies an output from the bridge circuit 17 by an appropriate scaling factor, thereby extracting a thrust which acts on the carriage 1. The sign of thrust information (f) is inverted, and then the resultant information is output to an adder 32. A sum from an adder 31 is output to an acceleration-to-thrust converter 26.

Outputs from a velocity compensator 11 and differentiator 25 physically have the same dimension as acceleration. The acceleration-to-thrust converter 26 converts these amounts having the acceleration dimension into a value having thrust dimension, and outputs the conversion result to the adder 32. The adder 32 adds an inverted output from the thrust detector 24, and outputs the sum to a thrust compensator 23.

As is apparent from the configuration shown in FIG. 7, a thrust feedback loop is formed by outputs from strain gauges 8*a* and 8*b*→the bridge circuit 17→the thrust detector 24→the thrust compensator 23→a power amplifier 16→a carriage motor 5→a belt 3→outputs from the strain gauges 8*a* and 8*b*→ . . . . This feedback loop can properly control a thrust which acts on the carriage 1.

According to the above-described embodiment, a desired thrust can be applied to the carriage 1 by the thrust feedback loop even in the presence of variations in the load torque of the carriage motor 5 and the torque ripple of the motor.

In this manner, the above-described embodiments can provide a low-cost acceleration detection means by detecting the acceleration of a carriage (a moving unit) by strain gauges. Thus, this invention is applicable to not only moving control on a carriage to which a printhead is mounted but also a device or apparatus which controls a moving unit.

Piezoelectric and servo acceleration sensors are generally very expensive, and it is not practical to implement such sensor in a consumer or industrial printing apparatus. The use of the strain gauges is therefore very advantageous in view of cost.

Further, strain gauges provided as a low-cost acceleration detection means can embody, at low cost, multiple feedback loops for the velocity and acceleration in the servo-mechanism of the carriage. This is very excellent in external disturbance suppression. For example, an inkjet printing apparatus to which the present invention is applied suffers unavoidable external disturbances such as variations in torque load, the torque ripple of the motor, and the temperature drift. The present invention can suppress scanning fluctuation of the carriage to sufficiently low level against these external disturbance factors.

Since the carriage acceleration and the thrust applied to the carriage are equivalent to each other, as described above, the use of the strain gauges provides thrust detection means. Hence, the servo-mechanism of the carriage can be formed by multiple feedback loops for the velocity and thrust. A thrust applied to the carriage can be appropriately controlled by this loop configuration.

A desired thrust can act on the carriage regardless of the presence of external disturbance, and the carriage can be stably scanned without any scanning fluctuation of the carriage.

The above-described embodiments can achieve high printing density and precision by using, of inkjet printing methods, a method of using means (e.g., electrothermal transducer or laser beam) for generating thermal energy as energy used to discharge ink, and causing a state change of ink by the thermal energy.

In addition, the printing apparatus according to the present invention may take the form of an integral or separate image output terminal for an information processing apparatus (e.g., a computer, image scanner, or digital camera) via a wire or wireless interface, the form of a copying machine combined with a reader or the like, or the form of a facsimile apparatus having a transmission/reception function.

As many apparently widely different embodiments of the present invention can be made without departing from the spirit and scope thereof, it is to be understood that the invention is not limited to the specific embodiments thereof except as defined in the appended claims.

What is claimed is:

1. A carriage drive control method applied to a printing apparatus which prints by moving a carriage, to which a printhead is mounted, relative to a printing medium, comprising:

a first detection step of extracting moving velocity information of the carriage;

a second detection step of extracting acceleration information of the carriage on the basis of outputs from first and second strain gauges which are attached to a flexible belt for transmitting a drive force from a carriage motor to the carriage, the first and second strain gauges being respectively attached on opposite sides of a fixing unit for fixing the carriage to the flexible belt;

a compensation step of compensating for the acceleration information of the carriage extracted in said second detection step on the basis of the moving velocity information of the carriage extracted in said first detection step; and a control step of feedback-controlling driving of the carriage motor on the basis of the acceleration information of the carriage compensated in said compensation step, wherein said second detection step includes the steps of:

detecting a thrust which acts on the carriage, on the basis of a difference between the respective outputs from the first and second strain gauges; and obtaining the acceleration information by dividing the thrust by mass of the carriage.

2. A carriage drive control method according to claim 1, wherein the printing apparatus includes a first pulley and a second pulley which are respectively arranged at opposite ends of a movable range of the carriage, and wherein the first strain gauge is arranged between the first pulley and the fixing unit, and the second strain gauge is arranged between the second pulley and the fixing unit.

3. A printing apparatus which prints by moving a carriage, to which a printhead is mounted, relative to a printing medium, comprising:

a carriage motor which generates a drive force for driving the carriage;

a flexible belt to which the carriage is fixed and which transmits the drive force generated by said carriage motor to the carriage;

first and second strain gauges which are arranged on said flexible belt on opposite sides of a fixing portion through which the carriage is fixed to said flexible belt;

first detection means for extracting moving velocity information of the carriage;

second detection means for extracting acceleration information of the carriage on the basis of outputs respectively from said first and second strain gauges;

compensation means for compensating for the acceleration information of the carriage extracted by said second detection means on the basis of the moving velocity information of the carriage extracted by said first detection means; and control means for feedback-controlling driving of said carriage motor on the basis of the acceleration information of the carriage compensated by said compensation means, wherein said second detection means includes:

thrust detection means for detecting a thrust which acts on the carriage, on the basis of a difference between the respective outputs from said first and second strain gauges; and obtaining means for obtaining the acceleration information by dividing the thrust by mass of the carriage.

4. The apparatus according to claim 3, wherein said first detection means includes a linear encoder.

5. The apparatus according to claim 3, wherein said control means includes:

a first control loop which feedback-controls driving of said carriage motor on the basis of a moving velocity of the carriage; and a second control loop which feedback-controls driving of said carriage motor on the basis of an acceleration of the carriage.

6. The apparatus according to claim 3, wherein the printhead comprises an inkjet printhead which prints by discharging ink.

7. The apparatus according to claim 6, wherein the inkjet printhead comprises an electrothermal transducer for generating thermal energy to be applied to ink in order to discharge ink by using the thermal energy.

8. The apparatus according to claim 3, further comprising second compensation means for compensating for the moving velocity information of the carriage extracted by said first detection means, wherein said compensation means compensates for the acceleration information of the carriage on the basis of the moving velocity information of the carriage compensated by said second compensation means.

9. The apparatus according to claim 8, further comprising differentiation means for differentiating a velocity instruction value, wherein said compensation means compensates for the acceleration information of the carriage on the basis of the moving velocity information of the carriage compensated by said second compensation means and the velocity instruction value differentiated by said differentiation means.

10. The apparatus according to claim 3, further comprising a first pulley and second pulley that are respectively arranged at opposite ends of a movable range of the carriage, wherein the first strain gauge is arranged between the first pulley and the fixing portion, and the second strain gauge is arranged between the second pulley and the fixing portion.

* * * * *